(12) United States Patent
Okuda

(10) Patent No.: US 8,665,494 B2
(45) Date of Patent: Mar. 4, 2014

(54) PRINTING CONTROL APPARATUS AND PRINTING CONTROL METHOD

(75) Inventor: Kohei Okuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 13/415,129

(22) Filed: Mar. 8, 2012

(65) Prior Publication Data
US 2012/0229824 A1 Sep. 13, 2012

(30) Foreign Application Priority Data
Mar. 8, 2011 (JP) ................................ 2011-049926

(51) Int. Cl.
*H04N 1/60* (2006.01)

(52) U.S. Cl.
USPC .............................. 358/1.9; 358/518; 358/540

(58) Field of Classification Search
None
See application file for complete search history.

(56) References Cited

U.S. PATENT DOCUMENTS

| 6,775,030 B2 * | 8/2004 | Krabbenhoft et al. ......... 358/1.9 |
| 2003/0151757 A1 * | 8/2003 | Bestmann et al. ............. 358/1.9 |
| 2004/0004731 A1 | 1/2004 | Itagaki |
| 2004/0136018 A1 * | 7/2004 | Krabbenhoft ................. 358/1.9 |
| 2004/0150847 A1 * | 8/2004 | Mahy ............................. 358/1.9 |
| 2005/0190388 A1 | 9/2005 | Kawakami et al. |
| 2011/0164051 A1 * | 7/2011 | Marcu et al. .................. 345/604 |

FOREIGN PATENT DOCUMENTS

| JP | 2004-040184 A | 2/2004 |
| JP | 2005-244607 A | 9/2005 |

* cited by examiner

*Primary Examiner* — Dung Tran
(74) *Attorney, Agent, or Firm* — Nutter McClennen & Fish LLP; John J. Penny, V.

(57) ABSTRACT

Based on an input profile which regulates a corresponding relationship between an input gradation value of a device-dependent color space depending on a first printing apparatus and a gradation value of a device-independent color space, and an output profile which regulates a corresponding relationship between a gradation value of a device-independent color space and an input gradation value of a device-independent color space depending on a second printing apparatus, the colors of each pixel of a case, where the gradation values of each pixel shown by reference image data are input gradation values of the device-dependent color space depending on the first printing apparatus, are specified by the input gradation value of the device-dependent color space depending on the second printing apparatus, and the output gradation value is specified by converting the specified input gradation value based on the color conversion table of the second printing apparatus.

4 Claims, 5 Drawing Sheets

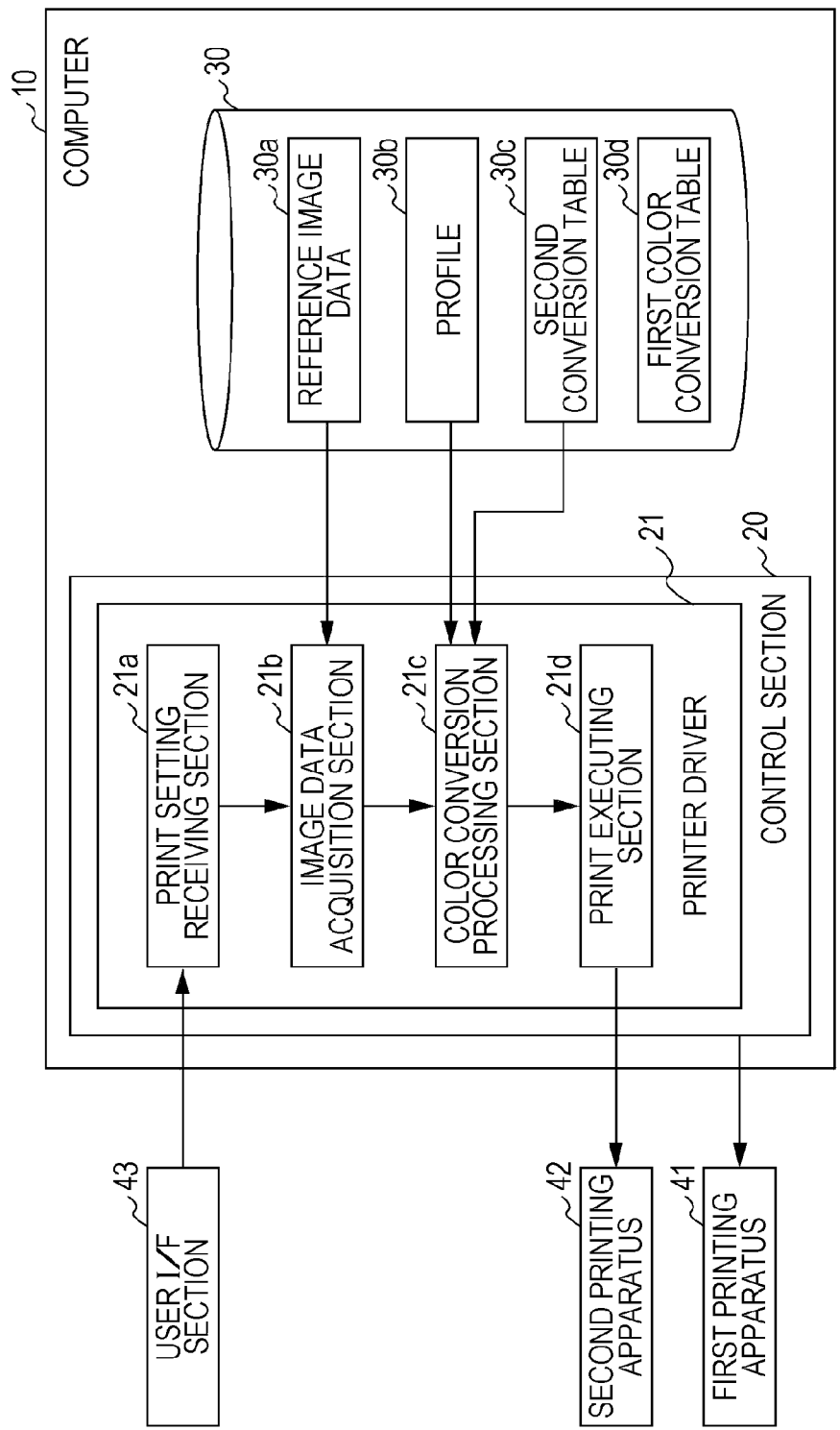

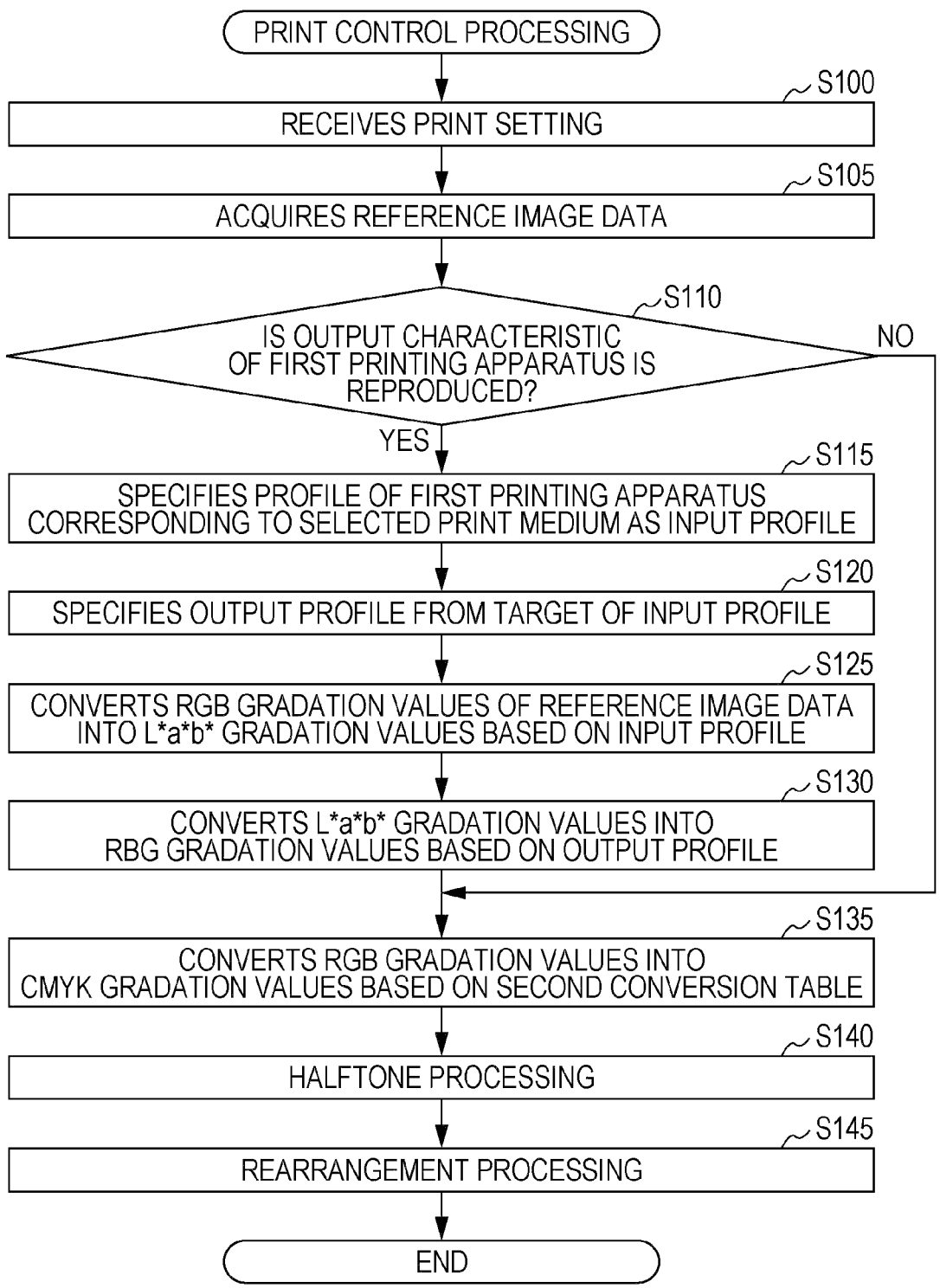

PRINTING CONTROL APPARATUS AND PRINTING CONTROL METHOD

Priority is claimed under 35 U.S.C. 119 to Japanese Patent Application No. JP 2011-049926 filed on Mar. 8, 2011, which is hereby incorporated by reference in its entirety.

BACKGROUND

1. Technical Field

The present invention relates to a printing control technique which performs a color conversion processing and performs the printing.

2. Related Art

An RGB color space (R: red, G: green, and B: blue) used in a device such as a digital camera creating image data and a CMYK color space (C: cyan, M: magenta, Y: yellow, and K: black) used in a printing apparatus are a device-dependent color space. Thus, a color management technique is known which causes colors between the input and output devices to associate with each other in the device-independent color space, in order to match the intended colors between input and output devices. For example, the technique disclosed in JP-A-2005-244607 discloses a technique which selects and describes an input profile and an output profile in a job ticket, combines the input profile and the output profile described in the job ticket with each other to create a link profile, and performs a color conversion based on the link profile.

In the related art, there is a need to select input and output profiles with intention of a user, and in order to perform color management, there is a need for advanced knowledge. For example, models of the printing apparatus are different from each other, as color output characteristics are usually different for each model due to a difference in kinds of ink or the like. However, all the users cannot select suitable input and output profiles in order to obtain the output characteristics intended by a user.

In addition, companies that manufacture printing apparatus always continue to develop improved performance for each model, and old models are replaced by new models every few years to reflect the results of the development. Thus, once the old models are replaced by the new models, in many cases, it is difficult to obtain the old models. Meanwhile, when a user, who performs a use for the same purpose as that of the old model, performs the printing with the same purpose, in many cases, the old models are replaced by the new models, the new models having been obtained by a further purchase or the like. In this case, it is assumed that the printing for the same purpose is performed between the different models. However, since the output characteristics of the color to be output by the different models are different from each other, it is difficult to obtain printed matter of the color equivalent to each other.

SUMMARY

An advantage of some aspects of at least one embodiment of the invention is to provide a technique that is able to easily perform printing that reproduces the output color characteristics of a first printing apparatus by a second printing apparatus.

According to an aspect of at least one embodiment of the invention, when selection is received which reproduces reference output characteristics that are output characteristics of the color of the case of performing the printing based on reference image data by a first printing apparatus through a second printing apparatus, colors for each pixel of a case, where gradation values for each pixel indicated by the reference image data are input gradation values of a device-dependent color space depending on the first printing apparatus, are specified to input gradation values of the device-dependent color space depending on the second printing apparatus, the output gradation values are specified by converting the specified input gradation values based on a color conversion table of the second printing apparatus, thereby performing the printing.

That is, if the gradation values for each pixel indicated by the reference image data are considered as input gradation values of the device-dependent color space depending on the first printing apparatus and the input gradation values are converted into the gradation values of the device-independent color space by the input profile, it is possible to specify color of the printed matter printed by the first printing apparatus based on the reference image data by the gradation value of the device-independent color space. Thus, if the gradation value of the device-independent color space is converted into the input gradation value of the device-dependent color space depending on the second printing apparatus by the output profile, by further converting the conversion result by the color conversion table of the second printing apparatus, it is possible to specify the output gradation value for outputting color of the printed matter to be printed by the first printing apparatus based on the reference image data by the second printing apparatus.

Thus, by performing the printing based on the output gradation value, it is possible to execute the printing which reproduces the output characteristics of the color of the first printing apparatus by the second printing apparatus. In addition, in order to perform the printing, a user may select whether or not the reference output characteristics, which are the output characteristics of the color of the first printing apparatus, are reproduced by the second printing apparatus, but does not need to select the input profile and the output profile. Thus, it is possible to easily execute the printing which reproduces the output characteristics of the color of the first printing apparatus by the second printing apparatus.

Herein, the first printing apparatus and the second printing apparatus are identical to each other in number of colors of the ink used. The situation frequently occurs in a case where the first printing apparatus is different from the second printing apparatus in a model, but both of them has the same application, and the first printing apparatus is earlier than the second printing apparatus in release time. Under the circumstance due to the fact that the number of colors of ink is identical to each other, the color gamut of the first printing apparatus largely overlaps with the color gamut of the second printing apparatus, and the forms thereof are similar to each other. Thus, it is relatively easy to reproduce the output characteristics of the first printing apparatus by the second printing apparatus. In addition, as the application of the printing apparatus, it is possible to adopt a configuration considering that the printing apparatuses, which can be specified by various elements and, for example, in which the size of a usable print medium and the kind of ink are matched to each other, have the same application. Specifically, it is assumed that the printing apparatus, which can print on a large print medium of A3 size or more, and uses ink having high light resistance and high water resistance, is considered to have the same application (a poster printing application or the like).

Furthermore, the first printing apparatus is different from the second printing apparatus in at least ink of one color. The situation also frequently occurs in a case where the first printing apparatus is different from the second printing apparatus in model, but both of them have the same application, and the first printing apparatus is earlier than the second printing apparatus in release time. That is, if all ink is identical in the first printing apparatus and the second printing apparatus, when executing the printing by performing the color conversion by the color conversion table of the second printing apparatus based on the reference image data printed by the first printing apparatus in the past, normally, almost the same color development is provided. However, when ink of one color or more is different, in many cases, the color development is not the same even if the printing is executed by performing the color conversion by the color conversion table of the second printing apparatus based on the reference image data. Thus, by applying this aspect of the invention under the circumstance, it is possible to execute this aspect of the invention under the situation where it is significant to perform the processing for reproducing the output characteristics of the color of the first printing apparatus by the second printing apparatus.

In addition, the first printing apparatus is different from the second printing apparatus in the color conversion table for converting the input gradation value of the device-dependent color space depending on the printing apparatus into the output gradation value of the device-dependent color space where the ink color is the color component. The situation also frequently occurs in a case where the first printing apparatus is different from the second printing apparatus in a model, but both of them have the same application, and the first printing apparatus is earlier than the second printing apparatus in release time. Moreover, when the color conversion table is different, generally, since the conversion of a memory color, a degree of smoothing of half-toning or the like performed in the course of creating the color conversion table is different from each other, the output characteristics of the color are different from each other. Thus, by applying this aspect of the invention to the situation, it is possible to execute this aspect of the invention under the situation where it is significant to perform the processing for reproducing the output characteristics of the color of the first printing apparatus by the second printing apparatus.

An output characteristic receiving unit may receive the selection of whether or not the reference output characteristics, which are the color output characteristics of the first printing apparatus, are reproduced by the second printing apparatus. That is, a configuration may be adopted so that a predetermined UI is configured in a display connected to a computer, display included in the second printing apparatus or the like, and a user can input instruction for performing the processing of reproducing the color development of the first printing apparatus by the second printing apparatus. Herein, a configuration may be adopted so that the selection, of whether or not the reference output characteristics, which are the output characteristics of the color of the first printing apparatus, are reproduced by the second printing apparatus, is received in the state of not needing to select the input profile and the output profile. For example, it is possible to adopt a configuration or the like in which a button instructing an emulation of the first printing apparatus is provided in a UI of a printer driver.

The color converting unit may be configured so that, before executing the normal color conversion by the color conversion table of the second printing apparatus so as to perform the printing by the second printing apparatus, it can specify colors for each pixel of a case, where the gradation values for each pixel indicated by the reference image data by the use of the input profile and the output profile are input gradation values of the device-dependent color space depending on the first printing apparatus, to the input gradation value of the device-dependent color space depending on the second printing apparatus. That is, the technique of performing the color management by the use of the input profile and the output profile is a generic technique incorporated in a generic OS, a printer driver attached to many printing apparatuses or the like.

Thus, a configuration is adopted in which a profile is prepared in advance as the input profile in which a corresponding relationship between the input gradation value of the device-dependent color space depending on the first printing apparatus and the gradation value of the device-independent color space is regulated, and a profile is prepared in advance as the output profile in which a corresponding relationship between the gradation value of the device-independent color space and the input gradation value of the device-dependent color space depending on the second printing apparatus is regulated. According to the configuration, it is possible to receive the selection which reproduces the reference output characteristics by the second printing apparatus, and when performing the printing by the second printing apparatus based on the reference image data which is the image data printed in the past by the first printing apparatus, merely by selecting the input profile and output profile prepared in advance and performing the color management by the use of the generic technique mentioned above, the input gradation value of the second printing apparatus is specified which reproduces the output characteristics of the color of the first printing apparatus. Thus, merely by performing the normal color conversion by the color conversion table based on the specified input gradation value, it is possible to reproduce the output characteristics of the color of the second printing apparatus by the second printing apparatus.

In addition, since the input profile and output profile prepared in advance are used as a set when reproducing the output characteristics of the color of the first printing apparatus by the second printing apparatus, it may be configured so that information causing both of them to associate with each other is included in one of them. For example, when a tag showing the output profile is included in the input profile and the second printing apparatus performs the selection which reproduces the output characteristics of the color of the first printing apparatus, the input profile of the first printing apparatus may be extracted, and the output profile of the second printing apparatus may be extracted based on the tag of the extracted input profile.

In addition, the input profile and the output profile may have a configuration which is regulated for each type of print medium becoming a target which is printed by the second printing apparatus. That is, if the print medium is different, the output characteristics of the color are different from each other. Thus, if the input profile and the output profile are regulated for each kind of print medium becoming the print target and becoming the target which is printed by the second printing apparatus to perform the printing, it is possible to reproduce the output characteristics of the first printing apparatus in various print mediums printed by the second printing apparatus. In addition, as the configuration receiving the print medium, for example, it is possible to adopt a configuration which receives a print medium desired by a user by the UI of the printer driver of the second printing apparatus.

In addition, like another aspect of at least one embodiment of the present invention, the method of performing the color management by selecting the input profile and the output profile for reproducing the output characteristics of the heterogeneous color depending on the selection which reproduces the output characteristics of the heterogeneous color can also be applied as the method or the program. Furthermore, the apparatus, method, and the program as mentioned above can be realized by the use of the component common to the apparatus having complex functions in some cases, if they are realized as a single apparatus, and they include various forms.

BRIEF DESCRIPTION OF THE DRAWINGS

The invention will be described with reference to the accompanying drawings, wherein like numbers reference like elements.

FIG. 1 is a block diagram of a printing control apparatus according to an embodiment of the invention.

FIG. 3 is a flow chart of a printing control processing.

DESCRIPTION OF EXEMPLARY EMBODIMENTS

Figure 2A:
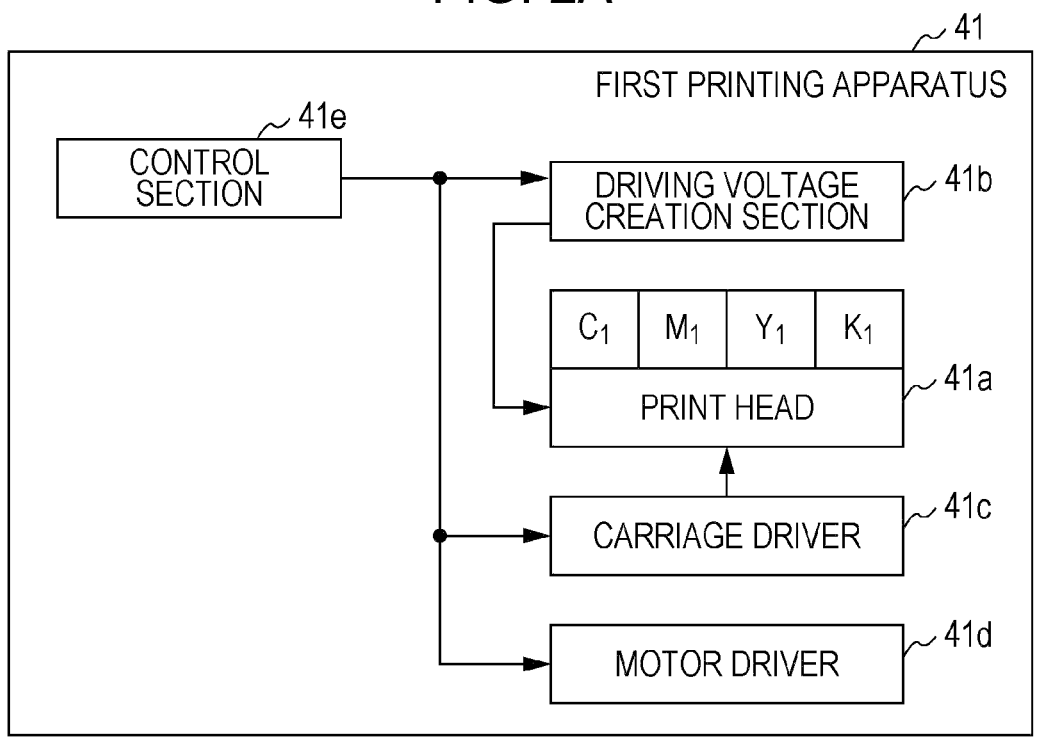
FIG. 2A is a block diagram of a first printing apparatus.

Herein, an embodiment of the invention will be described in accordance with an order as below.
1. Configuration of Printing Control Apparatus:
1-1. Configuration of Printer Driver and Printing Control Processing:
2. Another Embodiment:

1. Configuration of Printing Control Apparatus

FIG. 1 is a block diagram that shows a configuration of a computer 10 functioning as a printing control apparatus according to the invention. The computer 10 includes a control section 20 including a RAM, a ROM, a CPU or the like, and a HDD 30, and is able to execute programs recorded on the ROM, the HDD 30 or the like by the control section 20. In the present embodiment, as one of the programs, a printer driver 21 can be executed. The printer driver 21 is a driver program which is installed on the computer 10 for controlling a second printing apparatus 42 connected to the computer 10 via an interface (not shown).

In addition, in the present embodiment, along with the installation of the printer driver 21, a profile 30b and a second color conversion table 30c can be recorded on the HDD 30. Furthermore, in at least one embodiment of the present embodiment, a first printing apparatus 41 also is connected to the computer 10 via an interface (not shown), and a printer driver (not shown) for controlling the first printing apparatus 41 is also installed in the computer 10. According to the installation of the printer driver, the first color conversion table 30d is recorded on the HDD. In addition, a reference image data 30a printed previously by the first printing apparatus 41 is recorded on the HDD 30 of the computer 10.

FIG. 2A is a block diagram that shows the configuration of the first printing apparatus. The first printing apparatus 41 includes a printing mechanism which is constituted by a control section 41e including a ROM, a RAM, a CPU or the like, a head 41a, a driving voltage creating section 41b, a carriage driver 41c, a motor driver 41d or the like. By controlling each section of the control section 41e, ink can be printed on the print medium.

The first printing apparatus 41 according to the present embodiment is an ink jet printer that is able to discharge CMYK inks from the print head 41a (in the present specification, hereinafter, in the case of describing the color of ink concerning the first printing apparatus 41, a letter indicating a color component is denoted by a subscript numeral 1 such as $C_1 M_1 Y_1 K_1$). The first printing apparatus 41 includes a transport roller (not shown) installed along a transport path of the print medium, and is able to rotate the transport roller by a rotation driving force of a motor (not shown) connected to the transport roller, transport the print medium to a printing region between the print head 41a and a platen (not shown), and transport and discharge the print medium after printing from the first printing apparatus 41. The motor driver 41d includes a circuit which creates voltage to be applied to the motor, creates the voltage for rotating the motor by timing and rotation driving force instructed by the control section 41e according to the control signal which is output from the control section 41e, and applies the voltage to the motor.

The print head 41a is formed with a plurality of nozzles and ink droplets can be discharged from the respective nozzles. In the present embodiment, a plurality of nozzle rows with a plurality of nozzles arranged in one direction is formed in the print head 41a. In the present embodiment, the nozzle rows corresponding to each $C_1 M_1 Y_1 K_1$ color are formed. Each nozzle is an opening section of an ink chamber connected to an ink tank (not shown), and a wall surface of the ink chamber is configured so as to be movable depending on the expansion and contraction of a piezoelectric element. When the piezoelectric element is expanded or contracted, the volume of the ink chamber fluctuates in conjunction with the fluctuation of the wall surface of the ink chamber, and the ink in the ink chamber is discharged from the nozzles.

The driving voltage creation section 41b is connected to the plurality of piezoelectric elements corresponding to the plurality of nozzles. The driving voltage creation section 41b includes a circuit creating a periodic voltage of a predetermined waveform. The voltage is applied to the piezoelectric element, whereby the piezoelectric element is driven and the ink droplets are discharged. The control section 41e can select and apply the voltage waveform created by the driving voltage creation section 41b to a piezoelectric element of a certain nozzle by outputting the control signal.

In addition, in the present embodiment, the print head 41a is configured so that it can be reciprocated by a carriage (not shown) in a predetermined direction. That is, the carriage is able to move the print head 41a in a predetermined direction by the control of the carriage driver 41c. Furthermore, when the print head 41a reaches to an end section of a range movable in a direction perpendicular to a predetermined direction, the control section 41e outputs the control signal to the motor driver 41d, and transports the print medium by a unit distance in a direction perpendicular to the predetermined direction of movement of the print head 41a.

In addition, whenever the print head 41a is moved by a unit distance in the predetermined direction, the control section 41e outputs the control signal to the driving signal creation section 41b, selects a predetermined voltage waveform, applies the voltage waveform to the piezoelectric element, and discharges ink from the nozzles. As a consequence, the control section 41e is able to record the $C_1 M_1 Y_1 K_1$ inks on the print medium to print the image. In the present specification, the motion of moving the print head 41a in the predetermined direction is referred to as a horizontal scanning. Furthermore, a motion of transporting the transport medium in the direction perpendicular to the horizontal scanning direction is referred to as a vertical scanning.

Figure 2B:
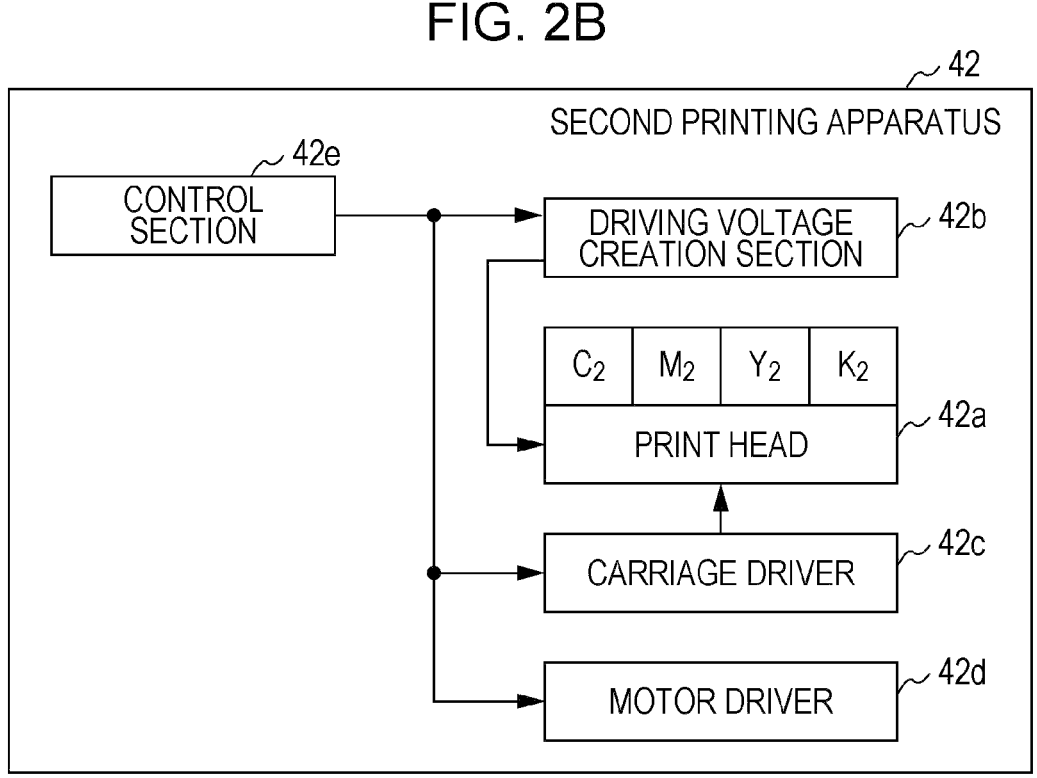
FIG. 2B is a block diagram of a second printing apparatus.

FIG. 2B is a block diagram that shows a configuration of the second printing apparatus 42. The second printing apparatus 42 includes a printing mechanism which is constituted by a control section 42e having the same function as that of the first printing apparatus 41, a print head 42a, a driving voltage creating section 42b, a carriage driver 42c, a motor driver 42d or the like. That is, the second printing apparatus 42 according to the present embodiment is an ink jet printer that is able to discharge CMYK inks from the print head 42a (in the present specification, hereinafter, in the case of describing the color of the ink concerning the second printing apparatus 42, a letter indicating a color component is denoted by a subscript numeral 2 such as $C_2M_2Y_2K_2$).

In the present embodiment, the number of colors of inks used in the first printing apparatus 41 and the second printing apparatus 42 is four. However, all of the CMYK inks of the first printing apparatus 41 and the second printing apparatus 42 are different from each other. That is, in the present embodiment, it is assumed that the first printing apparatus 41 is earlier than the second printing apparatus 42 in release time, and both applications of them are identical to each other. Thus, an improvement in ink characteristics can be promoted due to a difference in release time, and thus, the components of ink are different from each other in each CMYK color. That is, the $C_1M_1Y_1K_1$ inks and the $C_2M_2Y_2K_2$ inks shown in FIGS. 2A and 2B are different from each other, and the output characteristics of the color of the first printing apparatus 41 and the output characteristics of the color of the second printing apparatus 42 are different from each other.

The first printing apparatus 41 and the second printing apparatus 42 are connected to the computer 10, and the printing is executed by the control of the computer 10. That is, the first printing apparatus 41 is able to execute the printing by the execution of the printer driver 21 by the control section 20, and the second printing apparatus 42 is able to execute the printing by the execution of the printer driver 21 by the control section 20.

Moreover, the control section 20 executes the printing by referring to the first color conversion table 30d when performing the printing by the first printing apparatus 41, and executes the printing by referring to the second color conversion table 30c when performing the printing by the second printing apparatus 42. The color conversion tables are tables for converting an input gradation value of a device-dependent color space depending on the printing apparatus into an output gradation value of the device-dependent color space in which the ink color is a color component. The input gradation value is associated with the output gradation value with regard to a plurality of representative points.

As mentioned above, the first printing apparatus 41 and the second printing apparatus 42 are printing apparatuses that perform the printing by the use of each CMYK color. Thus, the first color conversion table 30d and the second color conversion table 30c in the present embodiment are regulated as data in which the input gradation value of an RGB color space as the device-dependent color space depending on the printing apparatuses is associated with the output gradation value of the CMYK color space in the plurality of representative points.

In addition, in the present embodiment, the first color conversion table 30d is different from the second color conversion table 30c. That is, the results of using the first color conversion table 30d and the results of using the second color conversion table 30c so as to specify the output gradation value corresponding to the same input gradation value are different. In the present embodiment, the first printing apparatus 41 is earlier than the second printing apparatus 42 in release time, and the conversion of a memory color performed in the course of creating the color conversion table due to a difference in release time, a degree of smoothing of a halftoning or the like are different from each other. Thus, the first color conversion table 30d is different from the second color conversion table 30c. As a consequence, the first printing apparatus 41 is different from the second printing apparatus 42 in output characteristics of the color.

Figure 4A:
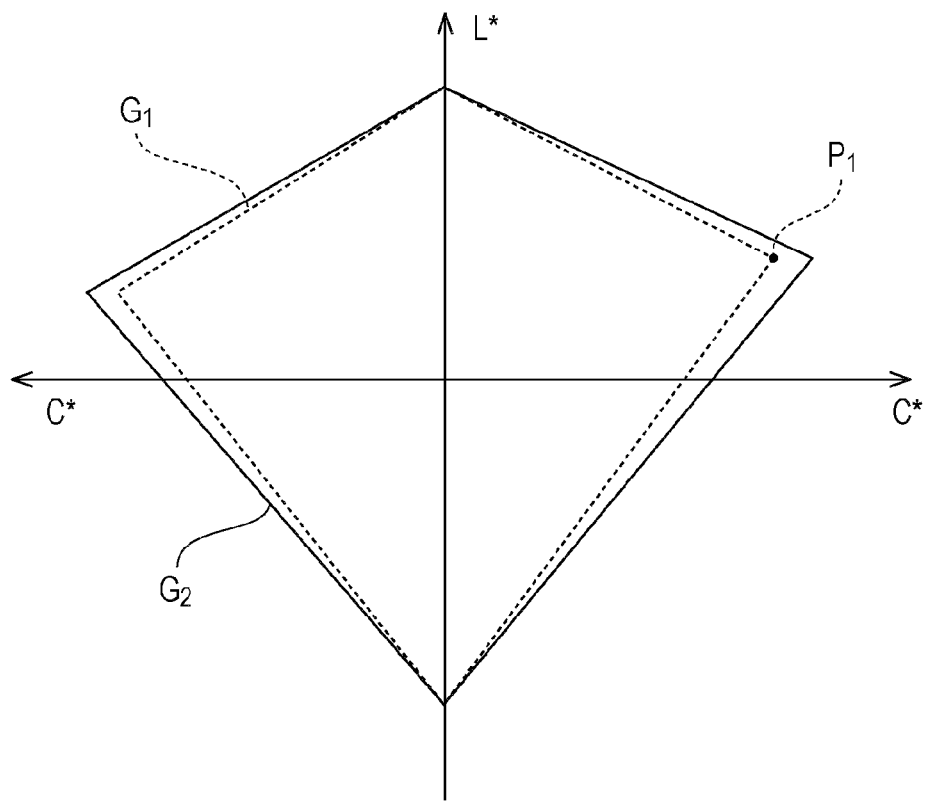
FIG. 4A is a diagram that shows a comparison of a color conversion table.

FIG. 4A is a diagram that indicates a cross section of a color gamut $G_1$ of the first printing apparatus 41 (dashed line), and a cross section of a color gamut $G_2$ of the second printing apparatus 42 (solid line) in a graph in which a transverse axis thereof is chroma c*, and a longitudinal axis thereof is brightness L*. As shown in FIG. 4A, since the release time of the second printing apparatus 42 is later than that of the first printing apparatus 41, the color gamut is widened by an improvement in ink. In the first color conversion table 30d and the second color conversion table 30c each corresponding to the first printing apparatus 41 and the second printing apparatus 42, respectively, the representative points are regulated so that the color gamut can maximally be used. Thus, like point $P_1$ shown in FIG. 4A, in color corresponding to the top of the color gamut $G_1$ of the first printing apparatus 41, at least one color component becomes a maximum value in the input gradation value by the first color conversion table 30d. For example, when the point $P_1$ is red, in the first color conversion table 30d, the color corresponding relationship is regulated by the plurality of representative points so that the output gradation values $(C_1, M_1, Y_1, K_1)=(0, 255, 255, 0)$ outputting the color of the point $P_1$ are associated with the input gradation values $(R_1, G_1, B_1)=(255, 0, 0)$.

Meanwhile, since the point $P_1$ corresponds to the inner portion of the color gamut $G_2$ of the second printing apparatus 42, the input gradation value of the second color conversion table 30c does not become the maximum value in the color component having the maximum input gradation value in the first color conversion table 30d. For example, when the point $P_1$ is red, in the second color conversion table 30c, the color corresponding relationship is regulated by the plurality of representative points so that the output gradation values $(C_2, M_2, Y_2, K_2)=(0, 242, 242, 8)$ outputting the color of the point $P_1$ are associated with the input gradation values $(R_2, G_2, B_2)=(248, 5, 5)$.

As mentioned above, the first printing apparatus 41 is different from the second printing apparatus 42 in the used first color conversion table 30d and second color conversion table 30c, and the output characteristics of the color are different from each other. Thus, in the past, even when the reference image data 30a printed by the first printing apparatus 41 is subjected to a color conversion by the second color conversion table 30c and the printing is performed by the second printing apparatus 42, the color to be output is different from the color in the case of performing printing by the first printing apparatus 41 based on the reference image data 30a. Thus, the printer driver 21 in the present embodiment includes a function of reproducing the output characteristics of the color of the first printing apparatus 41 by the second printing apparatus 42 to perform the printing, and the reproduction of the output characteristics can be executed by instruction of a user.

1-1. Configuration of Printer Driver and Printing Control Processing

Next, a configuration and processing of the printer driver 21 controlling the second printing apparatus 42 mentioned above will be described. The printer driver 21 includes a print setting receiving section 21a, an image data acquisition section 21b, a color conversion processing section 21c, and a printing execution section 21d, and executes the printing control processing according to a flow chart shown in FIG. 3. In the present embodiment, the printing control processing shown in FIG. 3 is executed when the printing execution instruction is made by using the reference image data 30a recorded on the HDD 30 as an image to be printed.

A user I/F section 43 such as a display, a keyboard, and a mouse is connected to the computer 10 via an interface (not shown). When the printing control processing is started, the control section 20 receives the printing setting instructed by a user by the use of the user I/F section 43 (step S100) by the processing of the print setting receiving section 21a. That is, the control section 20 outputs the control signal to the user I/F section 43, selects the print medium to be printed, reproduces the output characteristics of the color of the first printing apparatus 41 by the second printing apparatus 42, and displays a selection screen which selects whether or not the printing is performed. In addition, the control section 20 reproduces the print medium input by a user and the output characteristics of the color of the first printing apparatus 41 by the second printing apparatus 42 by receiving the output signal from the user I/F section 43, and acquires the instruction whether or not the printing is performed.

Next, the control section 20 acquires the reference image data 30a specified as the print target (step S105) by the processing of the image data acquisition section 21b. In addition, herein, the processing of adjusting the number of pixels of the reference image data 30a so as to be printed at a default resolution is also performed. Next, the control section 20 determines whether or not the selection is performed which reproduces the output characteristics of the color of the first printing apparatus 41 by the second printing apparatus and performs the printing, by the processing of the color conversion processing section 21c (step S110). In step S110, when it is not determined that the selection is performed which reproduces the output characteristics of the color of the first printing apparatus 41 by the second printing apparatus and performs the printing, the control section 20 skips steps S115 to S130.

Meanwhile, in step S110, when it is determined that the selection is performed which reproduces the output characteristics of the color of the first printing apparatus 41 by the second printing apparatus and performs the printing, the control section 20 specifies the color to be output by the first printing apparatus 41 based on the reference image data 30a in the device-independent color space, and executes the color management for outputting the color specified in the device-independent color space to the second printing apparatus 42.

Figure 4B:
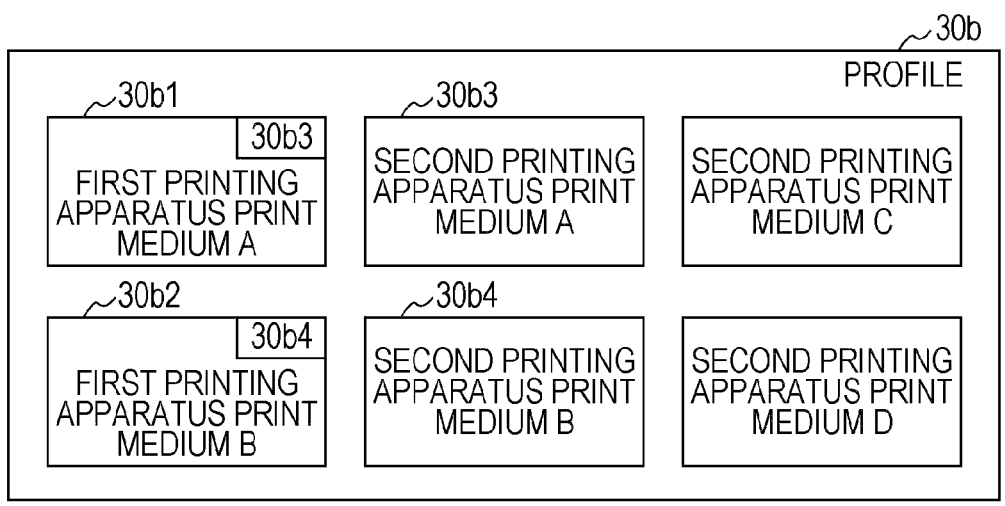
FIG. 4B is a diagram for describing a profile.

In order to execute the color management, in the present embodiment, the profile 30b is recorded on the HDD 30. Specifically, as shown in FIG. 4B, the profile 30b includes a profile in which the model of the printing apparatus (any one of the first printing apparatus and the second printing apparatus) is associated with the type of the print medium. In the example shown in FIG. 4B, reference numeral 30b1 indicates a profile in which the first printing apparatus is associated with a print medium A, reference numeral 30b2 indicates a profile in which the first printing apparatus is associated with a print medium B, reference numeral 30b3 indicates a profile in which the second printing apparatus is associated with the print medium A, and reference numeral 30b4 indicates a profile in which the second printing apparatus is associated with the print medium B.

Each respective profile is information for specifying the color to be recorded on the corresponding print medium when designating the RGB gradation value to perform the printing in the model of the corresponding printing apparatus (when performing the printing by the use of the first color conversion table 30d in the case of the first printing apparatus 41, and when performing the printing by the use of the second color conversion table 30c in the case of the second printing apparatus 42). In the present embodiment, such profiles cause the RGB gradation values to associate with the L*a*b* gradation values in regard to a plurality of representative points, and is able to convert the RGB gradation values to the L*a*b* gradation values and convert the L*a*b* gradation values to the RGB gradation values.

Figure 5A:
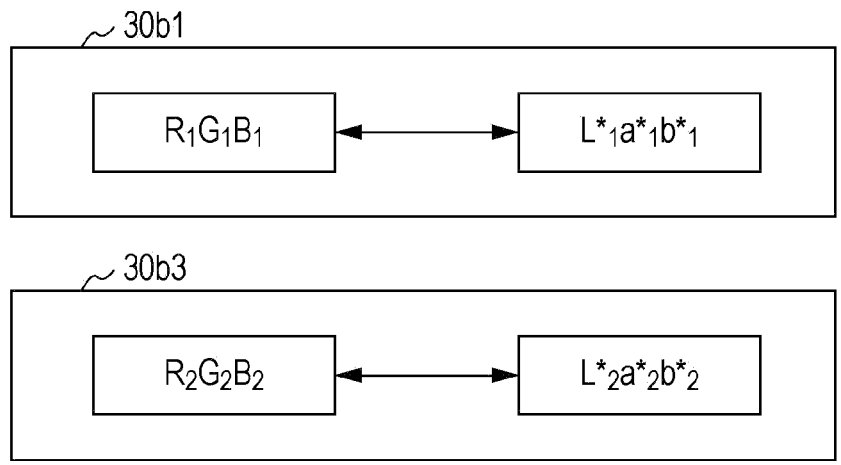
FIG. 5A is a diagram that shows a conversion by the profile.

FIG. 5A schematically shows the corresponding relationship by the profiles. That is, FIG. 5A shows that the profile 30b1, in which the first printing apparatus is associated with the print medium A, associates arbitrary $R_1G_1B_1$ gradation values to be input to the first printing apparatus 41 with the $L^*_1a^*_1b^*_1$ gradation values of the color to be printed by the input gradation values. Furthermore, FIG. 5A shows that the profile 30b3, in which the second printing apparatus is associated with the print medium A, associates arbitrary $R_2G_2B_2$ gradation values to be input to the second printing apparatus 42 with the $L^*_2a^*_2b^*_2$ gradation values of the color to be printed by the input gradation values.

In addition, the profile of the first printing apparatus 41 includes information indicating the profile (that is, the common profile of the print medium) of the second printing apparatus 42, which is used in a set, as a tag. For example, the profile 30b1 includes a tag designating the profile 30b3. In FIG. 4B, the existence of the tag is indicated by describing a rectangular shape denoted by sign 30b3 or the like in the rectangle indicating the profile.

Thus, the control section 20 specifies the profile of the first printing apparatus corresponding to the print medium selected in step S100 by the processing of the color conversion processing section 21c (step S115). Furthermore, the control section 20 refers to the tag included in the input profile specified in step S115, and specifies the output profile shown by the tag (step S120) by the processing of each color conversion processing section 21c. The input profile and output profile selected in this manner are profiles concerning the same print medium, and the L*a*b* gradation values of the color, which is output as a result of being printed based on the RGB gradation values shown by the reference image data 30a in the past by the first printing apparatus 41 using the print medium, can be specified based on the input profile specified in step S115. Meanwhile, the RGB gradation values required for printing the colors of the arbitrary L*a*b* gradation values on the print medium mentioned above by the second printing apparatus 42 can be specified by the output profile.

Figure 5B:
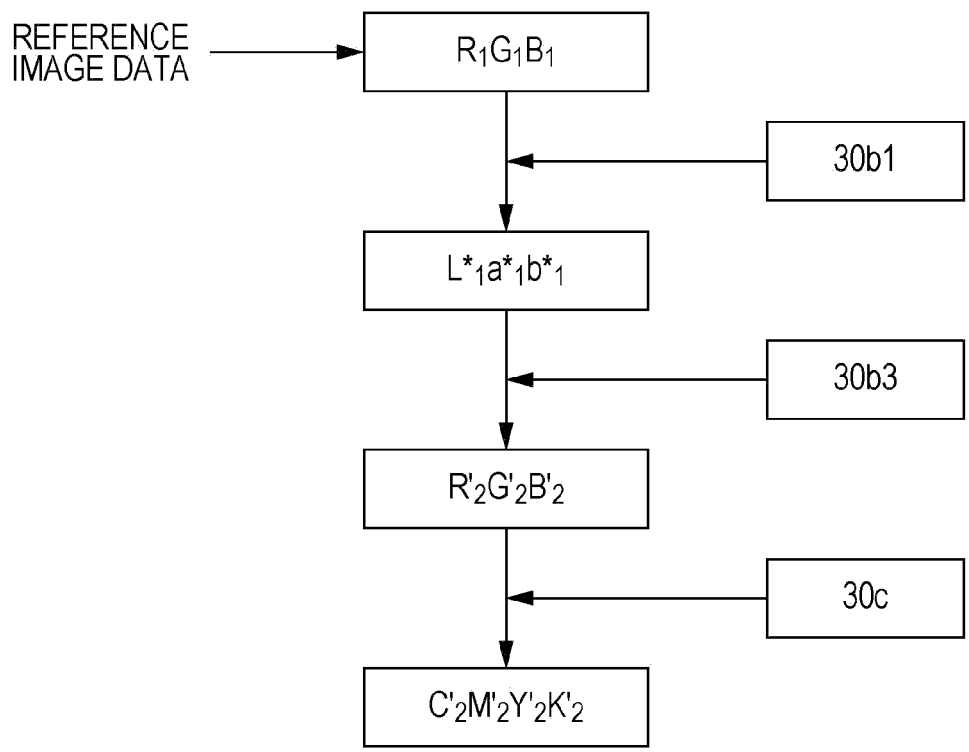
FIG. 5B is a diagram that shows a conversion by the profile and a color conversion table.

Thus, the control section 20 converts the RGB gradation values of the reference image data 30a into the L*a*b* gradation values based on the input profile by the processing of the color conversion processing section 21c (step S125). As a consequence, when performing the printing by the first printing apparatus 41 based on the reference image data 30a, the colors of each pixel are specified by the gradation values of L*a*b* color space which is the device-independent color space. For example, when the print medium A is selected and the RGB gradation values of the reference image data 30a are $R_1G_1B_1$, as shown in FIG. 5B, the gradation values $R_1G_1B_1$ are converted into the gradation values the $L^*_1a^*_1b^*_1$ based on the input profile 30b1 corresponding to the first printing apparatus 41 and the print medium A.

Next, the control section 20 converts the L*a*b* gradation values obtained in step S125 into the RGB gradation values based on the output profile, by the processing of the color conversion processing section 21c (step S130). As a consequence, in the case of performing the printing by the second printing apparatus 42, the RGB gradation values for designating the colors corresponding to the L*a*b* gradation values of each pixel are specified. For example, when the print medium A is selected and the gradation values $L*_1 a*_1 b*_1$ are specified based on the input profile 30b1, as shown in FIG. 5B, the gradation values $L*_1 a*_1 b*_1$ are converted into gradation values $R'_2 G'_2 B'_2$ ($\neq$ the gradation values $R_1 G_1 B_1$) based on the input profile 30b3 corresponding to the second printing apparatus 42 and the print medium A.

Thus, the control section 20 converts the RGB gradation values specified in step S130 into $C_2 M_2 Y_2 K_2$ gradation values based on the second color conversion table 30c, by the processing of the color conversion processing section 21c (step S135). As a consequence, the $C_2 M_2 Y_2 K_2$ gradation values showing an amount of ink for printing by the color (that is, the color shown by the L*a*b* gradation values specified in step S125) designated by the RGB gradation values are specified. In FIG. 5B, the $C_2 M_2 Y_2 K_2$ gradation values corresponding to the gradation values $R'_2 G'_2 B'_2$ are shown by $C'_2 M'_2 Y'_2 K'_2$ gradation values. The gradation values $C'_2 M'_2 Y'_2 K'_2$ obtained in this manner are gradation values for reproducing the colors ($L*_1 a*_1 b*_1$), which is output by the first printing apparatus 41 when the RGB gradation values of the reference image data are $R_1 G_1 B_1$, by the second printing apparatus 42. Thus, if the printing is executed based on the gradation values $C'_2 M'_2 Y'_2 K'_2$, the output characteristics of the color of the first printing apparatus 41 can be reproduced. In addition, in a case where step S135 is executed via steps S115 to S130, the processing target in step S135 is the RGB gradation values after the conversion of step S130. Meanwhile, in a case where steps S115 to S130 are skipped and step S135 is executed, the processing target in step S135 is the RGB gradation value shown by the reference image data of step S105.

Next, the control section 20 executes the half-tone processing by the processing of the printing execution section 21d (step S140). That is, the control section 20 creates the data showing the presence or absence of the discharging of ink droplets for each pixel, based on the $C_2 M_2 Y_2 K_2$ gradation values obtained in the step S135 mentioned above. Next, the control section 20 performs a rearrangement processing which rearranges the data after the half-tone processing, by the processing of the printing execution section 21d (step S145). That is, the control section 20 rearranges the sequence of the pixels so that the pixels, in which ink can be printed in each horizontal scanning, are arranged in an earlier order. Moreover, the control section 20 creates the print data so that the data for each pixel is transferred to the second printing apparatus 42 in the sequence after the rearrangement, and transfers the print data to the second printing apparatus 42. As a consequence, in the second printing apparatus 42, the printed matter reproducing the output characteristics of the color of the first printing apparatus 41, that is, the printed matter equivalent to the printed matter when printing by the first printing apparatus 41 based on the reference image data 30a is printed.

2. Another Embodiment

The embodiment mentioned above is an example for performing the invention, and as far as the color management can be performed by selecting the input profile and the output profile for reproducing the output characteristics of the heterogeneous colors depending on the selection reproducing the output characteristics of the heterogeneous colors, various embodiments can be adopted. For example, the printing control apparatus may be built in the second printing apparatus rather than the computer. Furthermore, the configuration for specifying the output profile is not limited to the tag built in the input profile. For example, the input profile and the output profile may be specified based on the print medium designated by a user. In addition, the profile is not limited to the configuration specified for each model of the printing apparatus and for each print medium, but may have a configuration which is specified depending on another condition, for example, a print resolution or the like.

In the embodiments mentioned above, as mentioned above, the first printing apparatus 41 and the second printing apparatus 42 are different from each other in CMYK inks, but a configuration may be adopted in which at least one color ink is different between the first printing apparatus 41 and the second printing apparatus 42. As an example of the configuration in which at least one color ink is different, various examples can be adopted. A configuration or the like can be assumed in which one of the first printing apparatus 41 and the second printing apparatus 42 uses a dye ink, and the other thereof uses a pigmented ink in at least one color (for example, K ink) of the CMYK inks. Furthermore, in a configuration which uses a white ink in the first printing apparatus 41 and the second printing apparatus 42, it is possible to assume a configuration which has a different color tone of white ink between the first printing apparatus 41 and the second printing apparatus 42. In addition, the color tone of ink can be adjusted by the composition of a coloring agent, an amount of the coloring agent per a unit quantity, or the like. Of course, the number of inks may be six colors or the like, without being limited to four colors.

In addition, the first printing apparatus 41 and the second printing apparatus 42 may have the same number of colors of ink, be different from each other in at least one color ink, and may be different from each other in the color conversion table for converting the input gradation value of the device-dependent color space depending on the printing apparatus into the output gradation value of the device-dependent color space where the ink color becomes the color component. Thus, even a printing apparatus of a different model, in which the first printing apparatus 41 and the second printing apparatus 42 are identical to each other in the number of colors of ink, constitutes an embodiment of the invention.

What is claimed is:

1. A printing control apparatus that causes a second printing apparatus to execute printing based on reference image data which is image data printed previously by a first printing apparatus, in a state where the first printing apparatus and the second printing apparatus are identical to each other in a number of colors of used ink, are different from each other in at least one color ink, and are different from each other in a color conversion table for converting an input gradation value of a device-dependent color space depending on a printing apparatus into an output gradation value of a device-dependent color space in which an ink color is a color component, the printing control apparatus comprising:

an output characteristic receiving unit that receives a selection indicating whether or not reference output characteristics, which are output characteristics of a color of the first printing apparatus, are reproduced by the second printing apparatus;

a profile specifying unit that sets a first profile, said first profile regulates a relationship between the input gradation value of the device-dependent color space depending on the first printing apparatus and a gradation value of a device-independent color space, as an input profile, and sets a second profile, said second profile regulates a relationship between the gradation value of the device-independent color space and the input gradation value of the device-dependent color space depending on the second printing apparatus, as an output profile, when the selection reproducing the reference output characteristics by the second printing apparatus is received;

a color converting unit that specifies colors for each pixel of a case, where gradation values for each pixel shown by the reference image data are input gradation values of the device-dependent color space depending on the first printing apparatus, by the input gradation value of the device-dependent color space depending on the second printing apparatus, based on the input profile and the output profile, and specifies the output gradation value by converting a specified input gradation value based on a color conversion table of the second printing apparatus; and a printing execution unit that causes the second printing apparatus to execute the printing based on the specified output gradation value.

2. The printing control apparatus according to claim 1, wherein the input profile and the output profile are regulated for each type of a print medium becoming a target printed by the second printing apparatus.

3. A printing control method that causes a second printing apparatus to execute printing based on reference image data which is image data printed previously by a first printing apparatus, in a state where the first printing apparatus and a second printing apparatus are identical to each other in the number of colors of used ink, are different from each other in at least one color ink, and are different from each other in a color conversion table for converting an input gradation value of a device-dependent color space depending on a printing apparatus into an output gradation value of a device-dependent color space in which an ink color is a color component, the method comprising:

receiving a selection indicating whether or not reference output characteristics, which are output characteristics of a color of the first printing apparatus, are reproduced by the second printing apparatus;

setting a first profile, said first profile regulates a corresponding relationship between the input gradation value of the device-dependent color space depending on the first printing apparatus and a gradation value of a device-independent color space, as an input profile, and setting a second profile, which regulates a relationship between the gradation value of the device-independent color space and the input gradation value of the device-dependent color space depending on the second printing apparatus, as an output profile, when the selection reproducing the reference output characteristics by the second printing apparatus is received;

specifying colors of each pixel of a case, where gradation values for each pixel shown by the reference image data are input gradation values of the device-dependent color space depending on the first printing apparatus, by the input gradation value of the device-dependent color space depending on the second printing apparatus, based on the input profile and the output profile, and specifying the output gradation value by converting a specified input gradation value based on a color conversion table of the second printing apparatus; and causing the second printing apparatus to execute the printing based on the specified output gradation value.

4. The printing control apparatus of claim 1, wherein the input profile and the output profile are specified based on a print medium designated by a user.

* * * * *